United States Patent [19]

Ishigami

[11] 4,066,303
[45] Jan. 3, 1978

[54] BRAKE PRESSURE-DIFFERENCE WARNING SYSTEM FOR VEHICLES

[75] Inventor: Noriakira Ishigami, Chiryu, Japan

[73] Assignee: Aisin Seiki Kabushiki Kaisha, Japan

[21] Appl. No.: 714,125

[22] Filed: Aug. 13, 1976

Related U.S. Application Data

[63] Continuation of Ser. No. 587,057, June 16, 1975, abandoned.

[30] Foreign Application Priority Data

June 14, 1974 Japan .................................. 49-68438

[51] Int. Cl.² .............................................. B60T 8/26
[52] U.S. Cl. ................................... 303/6 C; 188/349
[58] Field of Search ................... 303/6 C, 6 R, 84 A, 303/84 R; 188/151 A, 349; 200/82 D; 340/52 C

[56] References Cited

U.S. PATENT DOCUMENTS

| | | | |
|---|---|---|---|
| 3,450,443 | 6/1969 | Bueler | 303/6 C |
| 3,464,741 | 9/1969 | Falk | 303/6 C |
| 3,614,169 | 10/1971 | Bueler | 188/349 X |
| 3,680,921 | 8/1972 | Falk | 303/84 A X |
| 3,754,792 | 8/1973 | Ishigami et al. | 303/6 C |
| 3,937,523 | 2/1976 | Ayers, Jr. et al. | 303/6 C |

Primary Examiner—Stephen G. Kunin
Assistant Examiner—Douglas C. Butler
Attorney, Agent, or Firm—Oblon, Fisher, Spivak, McClelland & Maier

[57] ABSTRACT

A brake pressure failure warning system for use with a split or dual type braking system having two brake lines, includes a stepped piston associated with an electrical warning switch and supplied with brake pressure from both of the brake lines, a proportioning valve disposed within the rear wheel brake line, and three fluid chambers each fluidically connected with the stepped piston or the proportioning valve. When either one of the three fluid chambers is subjected to a hydraulic failure, the stepped piston is axially moved so as to actuate the warning switch.

5 Claims, 1 Drawing Figure

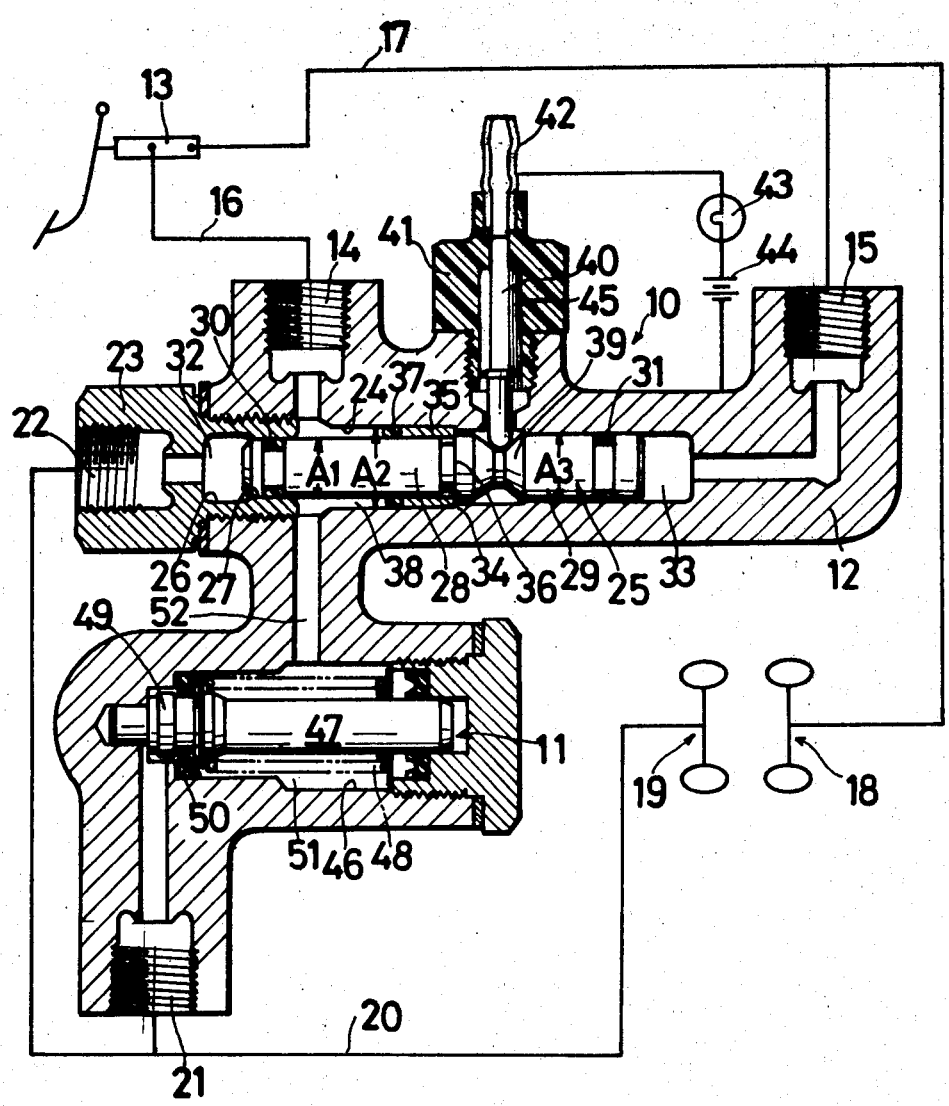

BRAKE PRESSURE-DIFFERENCE WARNING SYSTEM FOR VEHICLES

This is a continuation, of application Ser. No. 587,057, filed June 16, 1975, now abandoned.

BACKGROUND OF THE INVENTION

1. Field of the Invention

The present invention relates generally to a fluid pressure failure warning system for vehicle brakes, and more particularly to a brake pressure difference warning system used within a split type brake assembly and associated with a proportioning valve assembly for automobiles for cooperation therewith.

2. Description of the Prior Art:

Within a split or dual type brake system, at least two independent brake lines are provided so as to apply the brakes, and usually the front and rear wheel brakes are applied independently of each other. When a hydraulic failure occurs within one of the brake lines, the vehicle driver should be notified of the same, and many warning systems have been proposed in order to give such notice of fluid pressure failure to the driver.

It is also a conventional practice to incorporate a proportioning valve within the rear wheel brake line so as to thereby apply the proportioning brake pressure to the rear wheel brakes. The proportioning valve may sometimes be ineffective, such as for example, the reciprocable piston of the proportioning valve may be maintained seated upon a valve seat thereof so that no brake pressure is able to be supplied to the rear wheel brakes.

Under such conditions, it is desirable to give notice of such failure of the proportioning valve to the driver, and in addition, it is desirable to compensate the pressure decrease of the rear wheel brakes which is caused as a result of the interruption of fluid supply to the rear wheel brakes because of the continuous seating of the reciprocable piston relative to or upon its valve seat.

SUMMARY OF THE INVENTION

Accordingly, it is an object of the present invention to provide a brake pressure difference warning system wherein the failure of the proportioning valve is indicated and the brake pressure decreases due to such failure is compensated.

Another object of the present invention is to provide a brake pressure difference warning system wherein when either one of the brake lines is subjected to a failure, the operation of the proportioning valve is terminated or disabled by means of by-passing the brake fluid pressure about the valve so that the brake pressure decrease is compensated.

A further object of the present invention is to provide a brake pressure difference warning system which is automatically adjusted solely as a result of the application of the fluid pressure after the hydraulic failure has been repaired.

A still further object of the present invention is to provide a brake pressure difference warning system which is simple and compact in construction.

BRIEF DESCRIPTION OF THE DRAWING

Various other objects, features and attendant advantages of the present invention will be more fully appreciated as the same becomes better understood from the following detailed description when considered in connection with the accompanying drawing wherein:

The sole FIGURE is a schematic, cross-sectional view of one embodiment of a brake pressure difference warning system constructed in accordance with the present invention and showing its cooperative parts.

DETAILED DESCRIPTION OF A PREFERRED EMBODIMENT

Referring now to the drawing, a pressure difference warning assembly, generally indicated by the reference character 10, and a proportioning valve assembly, generally indicated by the reference character 11, are incorporated within a common housing 12. A split-type master cylinder 13 is fluidically connected to inlet ports 14 and 15 of the housing 12 through means of conduits 16 and 17, respectively, conduit 17 also being fluidically connected to a set of front wheel brakes 18. A set of rear wheel brakes 19 are similarly fluidically connected to a conduit 20 which is in turn fluidically connected to an outlet port 21 of the housing 12 as well as to an outlet port 22 of a plug 23 threadedly secured within housing 12.

The housing 12 includes a stepped axial bore 24 within which a stepped piston 25 of the warning assembly 10 is slidably disposed, and the plug 23 is seen to include a large diameter bore 26 which fluidically communicates with the outlet port 22 and a small diameter bore 27 within which the left end of piston 25 is received. The stepped piston 25 comprises a small diameter portion 28 having a diameter $A_1$, and a large diameter portion 29 having a diameter $A_3$, and seal rings 30 and 31 are fitted upon opposite ends of the piston 25 so as to sealingly engage the bore 27 of plug 23 and bore 24 of housing 12, respectively. Consequently, a first fluid chamber 32 is defined within the left end of assembly 10 so as to communicate with the outlet port 22 and a second fluid chamber 33 is similarly defined within the right end of assembly 10 so as to communicate with the inlet port 15, the fluid within the chambers being associated with the opposite ends of the piston 25.

The housing 12 includes therein a shoulder 34 so as to thereby define the bore 24 which comprises a large diameter section having a diameter $A_2$, and a small diameter section having a diameter $A_3$, and it is to be noted that the relationship of the diameters $A_1 - A_3$ is $A_2 > A_3 > A_1$. An annular sleeve 35 is disposed about the small diameter portion 28 of piston 25 so as to abut shoulder 34, and it is also apparent that sleeve 35 also abuts an end shoulder 36 of the large diameter portion 29 of piston 25. An annular seal ring 37 is disposed about small diameter portion 28 of piston 25 in a co-axial manner with respect to sleeve 35 and piston portion 28, and consequently, an annular chamber 38 is defined within bore 24 between the ring seals 30 and 37.

The large diameter portion 29 of piston 25 is provided with a cam 39 having frusto-conical end portions and a central portion of reduced diameter which receives the dependent tip portion of a switch plunger 40 movably mounted within housing 12 and a fixed plug 41 threadedly secured within the housing. The plug 41 is made of plastic material and consequently has insulative properties, and a metallic tube 42, which is fixed within plug 41, is electrically connected to a warning lamp 43 which in turn is connected to an electric power source 44. The housing 12 is likewise electrically connected to the electric power source 44, and under normal brake fluid pressure conditions, the switch plunger 40 is biased so as to engage the cam 39 of piston 25 by means of a spring 45 disposed about plunger 40 and within plug 41.

The housing 12 further includes another axial bore 46 provided in parallel relationship with the stepped bore 24, and within bore 46 there is slidably disposed a valve piston 47 which forms part of the proportioning valve assembly 11, which construction is generally conventional. The valve piston 47 is biased toward the illustrated position by means of a coil spring 48 disposed about piston 47, and within such position, an enlarged valve portion 49 of piston 47 is spaced apart from a valve seat 50. Consequently, the outlet port 21 of housing 12 is fluidically communicated with a fluid chamber 51, defined within bore 46, which in turn, communicates with the annular chamber 38 of warning assembly 10 through means of a vertical passage 52, and it is also apparent that fluid chamber 51 is similarly fluidically communicated with the left end chamber 32 of the warning assembly, when the valve portion 49 of piston 47 is biased away from the valve seal ring seat 50, through means of ports 21 and 22.

As will be readily apparent to those skilled in the art, the valve piston 47 of the proportioning valve assembly 11 is moved toward the right when the hydraulic pressure admitted to the fluid chamber 51 from the master cylinder 13, through means of conduit 16, inlet port 14, annular chamber 38, and passage 52, exceeds a predetermined value, and consequently, the enlarged valve portion 49 of piston 47 is seated upon the seal member 50 so as to thereby interrupt fluid communication between fluid chamber 51 and the outlet port 21. The pressure increase to the rear wheel brakes is thus interrupted, however, the valve piston 47 is immediately moved back toward the left after a further pressure increase within chamber 51 so as to thereby reestablish fluid communication between fluid chamber 51 and outlet port 21.

Such a reciprocation of the valve piston 47 is repeated as long as the hydraulic pressure generated within the master brake cylinder 13 is increased and it will be understood from the foregoing that the hydraulic pressure applied to the rear wheel brakes 19 is reduced in comparison with the hydraulic pressure applied to the front wheel brakes 18.

During operation of the pressure difference warning assembly 10, when the hydraulic brake pressure of the conduits 16 and 17 is low, and no pressure difference exists therebetween, fluid pressure of the same value is admitted to the annular chamber 38, left chamber 32, and right chamber 33, and accordingly, the piston 25 of warning assembly 10 is disposed within the illustrated position. More specifically, the annular sleeve 35 is urged to move toward the right, due to the pressurized fluid within annular chamber 38, thereby resulting in abutment of the same with the shoulder 34 of housing 12. The piston 25 is similarly urged to move toward the right due to the pressurized fluid within left chamber 32, however the piston is also urged to move toward the left due to the pressurized fluid within right chamber 33. In conjunction with such, it is to be recalled that the diameter A2 of the stepped bore 24 is larger than the diameter A3 of the portion 29 of piston 25, and that the diameter A1 of the portion 28 of piston 25 is smaller than the diameter A3 of the portion 29 of piston 25, and therefore, piston 25 is maintained within the illustrated neutral position wherein the warning lamp 43 is not lit.

Even after the valve piston 47 of the proportioning valve assembly 11 commences its reciprocating movement and the hydraulic pressure within the left chamber 32 is less than the hydraulic pressure within annular chamber 38 or the right chamber 33, the piston 25 may nevertheless be maintained within the neutral position by providing each of the diameters A1–A3 with a value so that the ratio expression of $$\frac{A_3 - (A_2 - A_1)}{A_1}$$

corresponds to the hydraulic pressure increase ratio at the rear wheel brakes 19 after the commencement of the reciprocation of the valve piston 47.

Now, the operation of the warning assembly 10, in the even of hydraulic failure, will be hereinafter described.

When the hydraulic line including conduit 17 is subjected to failure, under such conditions, no hydraulic pressure is able to be supplied to the right chamber 33. The piston 25 is thus moved toward the right so that the plunger 40 is moved upwardly against the biasing force of spring 45 by means of the cam portion 39 of piston 25 whereby the plunger 40 is brought into engagement with metallic tube 42 thereby causing the lamp 43 to be lit. The rightward movement of piston 25 also causes the sealing ring 30 to be removed from the small diameter bore 27 of plug 23, and consequently, the left chamber 32 may be in fluid communication with the annular chamber 38 and the inlet port 14 so as to thereby supply pressurized fluid to the rear brake wheels 19 through means of conduit 20. The reciprocable movement of valve piston 47 is thus rendered ineffective so as to compensate the brake force failure of the front wheel brakes 18, or in other words, the hydraulic brake pressure is by-passed so as to actuate the rear wheel brakes directly from the master brake cylinder 13 in the event of hydraulic failure of the conduit 17.

Similarly, when the hydraulic line including conduit 16 is subjected to failure, under such conditions no hydraulic pressure is able to be supplied to the annular chamber 38 and the left chamber 32, and thus, the piston 25 is moved toward the left thereby moving the warning plunger 40 upwardly so as to thereby light lamp 43 in the aforenoted manner.

Still further, when the proportioning valve assembly 11 is subjected to a failure so as not to supply hydraulic pressure to port 21, that is, in the event that the valve piston 47 is maintained with the seal valve 50, even when the hydraulic pressure is being increased by means of the master brake cylinder 13, no hydraulic pressure is likewise admitted to the left chamber 32. Therefore, the piston 25 is moved toward the left due to the hydraulic pressure within the right chamber 33 until the sealing ring 30 is moved into the bore portion 26. The hydraulic pressure admitted to the inlet port 14 is thus by-passed so as to permit direct fluid communication between annular chamber 38 and the left chamber 32.

Now, the automatic returning operation of piston 25 will be explained.

According to the present invention, the piston 25 of the pressure difference warning assembly 10 is returned to the neutral position only as a result of the increased fluid pressure after the hydraulic failure has been repaired. Consequently, when the piston 25 has been moved toward the right, the hydraulic pressure supplied to the right fluid chamber 33 urges the piston 25 to move toward the left since the diameter A3 is larger than the diameter A1. When the end shoulder 36 of the piston 25 abuts the annular sleeve 35, the leftward movement of the piston 25 is limited as a result of the counteracting fluid pressure within annular chamber 38 and the left chamber 32.

Similarly, when the piston 25 has been moved toward the left, the hydraulic pressure supplied to the annular chamber 38 and the left chamber 32 urges the piston 25 to move toward the right since the diameter A2 is larger than the diameter A3. After the annular sleeve 35 abuts the shoulder 34 of the housing 12, further rightward movement of piston 25 is limited since the diameter A1 is smaller than the diameter A3.

The piston 25 of the warning assembly 10 is thus automatically returned to its neutral position solely as a result of the application of the fluid pressure within the system.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. A brake pressure-difference warning system operatively associated with a dual master brake cylinder having two independent brake lines, which comprises:

a housing provided with an axial bore defined therein;

a stepped piston slidably disposed within said bore and provided with a small diameter portion and a large diameter portion;

a proportioning valve assembly disposed within one of said brake lines;

a first fluid chamber defined within said housing at one end of said small diameter portion of said stepped piston;

a second fluid chamber defined within said housing and within said one brake line;

a third fluid chamber defined within said housing at one end of said large diameter portion of said stepped piston and disposed within the other brake line;

said first fluid chamber being in fluidic communication with said second fluid chamber through means of said proportioning valve assembly, said proportioning valve assembly thereby controlling pressurization of said first chamber and said piston at said one end thereof;

a seal member provided upon said small diameter portion of said stepped piston and interposed between said first and second fluid chambers;

switch means operatively connected to said stepped piston for indicating a fluidic failure within one of said brake lines;

said stepped piston having a predetermined configuration, and the stepped portions thereof having a predetermined area ratio with respect to each other, such that said stepped piston is axially movable within said bore when each of said first, second and third fluid chambers is subjected to a fluidic failure; and when said proportioning valve is inoperatively seated upon its valve seat and said second and said third fluid chambers are not subjected to a fluidic failure, whereby the hydraulic pressure within said first chamber is lower than the normal pressure supplied to said second chamber, said switch means is actuated and fluid communication between said first and said second fluid chambers is established without passing through said proportioning valve assembly.

2. A brake pressure difference warning system as set forth in claim 1, wherein:

said housing includes inner shoulder means for defining said bore into a large diameter section and a small diameter section, said large diameter portion of said stepped piston being disposed within said small diameter section of said bore; and annular sleeve means slidably disposed within said large diameter section of said bore and about said small diameter portion of said stepped piston for abutting said inner shoulder of said housing.

3. A brake pressure difference warning system as set forth in claim 2, wherein:

said first fluid chamber is larger in diameter than said small diameter portion of said stepped piston, whereby said fluid communication between said first and second fluid chambers is established when said seal member is moved into either one of said first and second fluid chambers.

4. A brake pressure difference warning system as set forth in claim 2, wherein said switch means comprises:

a movable plunger operatively connected with said stepped piston;

an insulative member mounted upon said housing and within which said plunger is disposed; and a conductive member upon said insulative member and normally being out of engagement with said plunger;

whereby said plunger is adapted to be brought into engagement with said conductive member when said stepped piston is axially moved.

5. A brake pressure difference warning system as set forth in claim 2, wherein:

said annular sleeve normally abuts one end of said large diameter portion of said stepped piston within a plane which is the same plane as that within which said inner shoulder of said housing is located.

* * * * *